Figure 1:
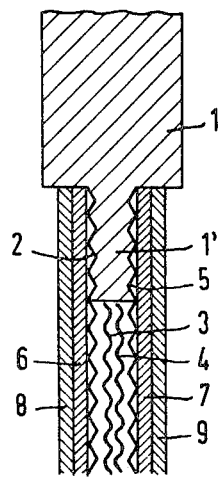

United States Patent [19]
Groppel

[11] 3,856,573
[45] Dec. 24, 1974

[54] METHOD OF PRODUCING A STRUCTURAL MEMBER FORMED OF ELECTRODES, COVER LAYERS AND A SUPPORT FRAME FOR FUEL ELEMENTS WITH A LIQUID ELECTROLYTE, AND STRUCTURAL MEMBER PRODUCED BY THE METHOD

[75] Inventor: Dieter Groppel, Erlangen, Germany

[73] Assignee: Siemens Aktiengesellschaft, Berlin and Munich, Germany

[22] Filed: Aug. 16, 1972

[21] Appl. No.: 281,163

Related U.S. Application Data

[63] Continuation of Ser. No. 50,051, June 29, 1970, abandoned.

[30] Foreign Application Priority Data
July 1, 1969 Germany.............................. 1933305

[52] U.S. Cl........... 136/86 R, 136/120 FC, 136/175
[51] Int. Cl................H01m 27/00, H01m 37/00, H01m 27/02
[58] Field of Search .......... 161/44, 83, 88; 156/298, 156/299, 300; 136/86, 120; 117/27, 99

[56] References Cited
UNITED STATES PATENTS 3,126,302  3/1964  Drushella.......................... 136/86 R
3,236,693  2/1966  Caesar............................... 136/86 R
3,471,336  10/1969  Sturm et al. ....................... 136/86 R Primary Examiner—A. B. Curtis
Assistant Examiner—H. A. Feeley
Attorney, Agent, or Firm—Herbert L. Lerner

[57] ABSTRACT

Method of producing a compact, storable structural member, formed of electrodes, cover layers and a support frame, for fuel elements includes welding a first metal screen to one side of a framework formed of plastic material, placing a support frame of at least one screen of plastic material adjacent the first metal screen, welding a second metal screen to the other side of the framework so as to sandwich the support frame between the first and second metal screens, spraying on the metal screens at least one layer of fine-granular ion exchanger material suspended in a dissolved binding agent, and thereafter applying to the ion exchanger layers at least one layer of a catalyst suspended in a dissolved binding agent; and structural member produced by the method.

9 Claims, 2 Drawing Figures

METHOD OF PRODUCING A STRUCTURAL MEMBER FORMED OF ELECTRODES, COVER LAYERS AND A SUPPORT FRAME FOR FUEL ELEMENTS WITH A LIQUID ELECTROLYTE, AND STRUCTURAL MEMBER PRODUCED BY THE METHOD

This is a continuation, of application Ser. No. 50,051, filed June 29, 1970 now abandoned.

My invention relates to method of producing a structural member formed of electrodes, cover layers and a support frame for fuel elements, and structural member produced by the method.

Fuel elements with a porous support frame or skeletal supporting structure as electrolyte carrier are known from German Pat. No. 1,267,201. They have been produced heretofore by initially inserting screens formed of metal and/or plastic material and serving as support frame into a perforation of a framework of plastic material, a projecting part being provided for the perforation in the middle of the plastic framework. Cover layers, for example asbestos paper, were placed on cross pieces formed by the perforation in the projecting plastic part of the framework. Catalyst material and screens for conducting current away and for forming gas chambers were provided on the parts of the cover layers contacting the support frame. End plates disposed on the plastic framework form the closure for the fuel element.

To attain a gas- and liquid-tight closure of the individual structural members with respect to one another and to the exterior, circular tie rings must be inserted in the heretofore known fuel cells between the cover layers and plastic framework, on the one hand, and the end plates, on the other hand.

It is an object of my invention to provide method of producing a compact, storable structural member formed of electrodes, cover layers and support frame, for fuel elements, which affords a considerably simplified assembly therefrom of fuel cell batteries.

With the foregoing and other objects of my invention, I provide method of producing a compact, storable structural member, formed of electrodes, cover layers and a support frame, for fuel elements, which comprises welding a first metal screen to one side of framework formed of plastic material, placing a support frame of at least one screen of plastic material adjacent the first metal screen, welding a second metal screen to the other side of the framework so as to sandwich the support frame between the first and second metal screens, spraying on the metal screens at least one layer of fine-granular ion exchanger material suspended in a dissolved binding agent, and thereafter applying to the ion exchanger layers at least one layer of a catalyst suspended in a dissolved binding agent.

Also in accordance with my invention, I provide a structural member produced by the foregoing method and comprising a framework of plastic material, metal screens secured by welding to both sides of the framework, respectively, at least one screen of plastic material disposed between the metal screens, a cover layer and a catalyst layer being successively superimposed on each of the metal screens and being firmly bonded thereto by a binding agent.

The technical advance of my invention over the prior art is primarily that both electrodes and cover layers and the support frame can be serially prefabricated as a compact structural member which considerably facilitates the construction or assembly of fuel cell batteries. Also, damaged fuel cells can now be more readily replaced by functionable fuel elements.

Further advantages of my invention result from the fact that the cover layers are formed within and on metal screens which are firmly connected to the framework of plastic material. Thereby, expansion of the cover layers in direction of the plane in which the cover layers are disposed, upon contact with the electrolyte, is prevented so that leakiness due to dislocation of the cover layers need not be feared. By welding the metal screens to the framework of plastic material and by spraying the cover layers thereon, the required sealing between cover layers and gas chambers is furthermore attained so that the round tie rings heretofore required therefor are obviated and dispensed with. Homogeneous transition between the cover and the catalyst layers is attained moreover by employing the same binding agent in the respective layers. The catalyst layers are firmly bonded to the cover layers and, due to the binding agent content thereof, are wear-resistant and are adequately stable with respect to the stresses occurring in the course of storage thereof and when assembling a battery thereof.

Other features which are considered as characteristic for the invention are set forth in the appended claims.

Although the invention is illustrated and described herein as method of producing a structural member formed of electrodes, cover layers and a support frame for fuel elements with a liquid electrolyte, and structural member produced by the method, it is nevertheless not intended to be limited to the details shown, since various modifications and structural changes may be made therein without departing from the spirit of the invention and within the scope and range of equivalents of the claims.

Figure 2:
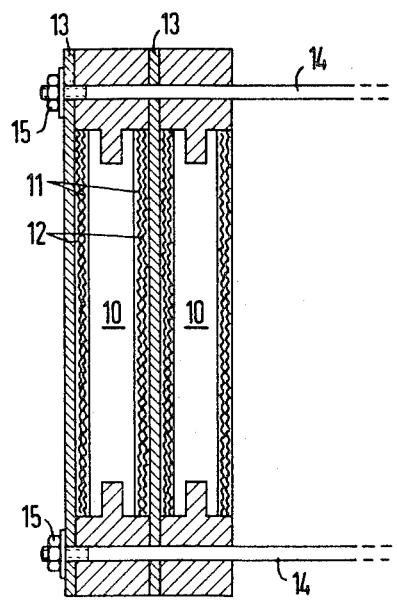

The invention, however, together with additional objects and advantages thereof will be best understood from the following description when read in connection with the accompanying drawing, in which:

FIG. 1 is a diagrammatic, fragmentary sectional view of a fuel cell produced by the method of the invention; and FIG. 2 is a diagrammatic sectional view of part of a fuel cell battery assembled from a plurality of the fuel cells of FIG. 1.

Referring now to the drawing, and first particularly to FIG. 1 thereof, there is shown a plastic framework 1 consisting of polystyrene. The framework 1 has a projection part 1' in the middle thereof to both sides of which, respectively, metal screens 2 and 5, for example nickel screens having a mesh size or aperture of 0.3 mm, are welded. Sandwiched between the nickel screens 2 and 5 are two coarse-mesh screens 3 and 4 (having a mesh size of about 0.5 mm) that are formed of polypropylene and form an electrolyte chamber. Instead of screens of plastic material, metal screens can also be employed for forming the electrolyte chamber, on principle, however, the danger arises therefrom that the electrodes may be short-circuited when the electrically non-conductive cover layers of a fuel cell are damaged. In the embodiment of the invention as shown in FIG. 1, cover layers 6 and 7 are applied by spraying to the metal screens 2 and 5, respectively, and catalyst layers 8 and 9 are respectively firmly bound to the cover layers 6 and 7. When assembling a battery of fuel cells from a plurality of the structural members shown in FIG. 1, screens, which are not illustrated in FIG. 1 are placed on the catalyst layers 8 and 9 for removing current from the battery or for forming the gas chambers of the fuel cells in the battery.

In the production of the structural member of FIG. 1 according to my invention, a metal screen 2 or 5 is initially welded to the plastic framework 1 in such a way that the metal screen is pressed on to a side of the projecting part 1' of the framework 1 by a heated die. Thereafter, the two screens 3 and 4 of plastic material are placed on the welded metal screen 2 or 5, and the second metal screen 5 or 2, as the case may be, is welded to the other side of the projecting part 1' so as to sandwich the plastic screens 3 and 4 between the metal screens 2 and 5. The cover layers 6 and 7 are then applied to the welded metal screens 2 and 5 from a suspension thereof in a desired thickness by means of a spray gun, preferably however in several layers, each of the layers being completely dried before applying the next layer thereon. To prevent sinking or deposition of the suspended particles, the suspension must be continually stirred during the spraying operation. The drying of the layers can be effected by continually rotating the plastic framework 1 in a suitable device wherein it is subjected to a supply of hot air during the spraying operation.

The suspension provided for forming the cover layers 6 and 7 is formed of an inorganic and/or an organic ion exchanger, for example asbestos flour or a polymer or a copolymer containing an exchange group, and an organic binding agent, for example polyisobutylene, polymethacryl acidic ester, polystyrene and the like, the ion exchanger being preferably in fine-granular form and being undissolved in the suspension medium, and the binding agent being dissolved in the medium. In order to attain a complete and reliable sealing between the respective cover layers 6 and 7 and the framework 1, a solvent mixture is preferably employed as a suspension medium. The solvent includes in addition to a solvent for the binding medium which does not attack or dissolve the plastic of the framework 1, an additional solvent wherein the plastic material of the framework 1 consisting for example of polystyrene, is soluble or is able to be steeped or soaked. Accordingly, the last mentioned solvent is added in such quantity that, during the spraying of the cover layers 6 and 7, only the surface of the framework projection 1' of plastic material is dissolved so that thereby the cover layers 6 and 7 are firmly anchored in the framework projection 1'. A solvent mixture of benzene or gasoline and xylene, for example, is suitable for a framework 1 of polystyrene. To increase the strength or stability and to reduce the solubility, it is furthermore advantageous if the binding agent, after the spraying operation, partially forms or is partially cross-linked in a conventional manner. For this purpose, suitable cross-linking media and accelerators, if desired are added to the suspension before it is sprayed on to the screens 2 and 5.

The catalyst layers 8 and 9 are formed of pulverulent material such as Raney-nickel and Raney-silver, for example, and are applied by means of a spray gun in the same manner as the cover layers 6 and 7 from a suspension of the pulverulent catalyst material containing the binding medium. In a preferred embodiment of my invention, the same binding agent is employed for the suspension of pulverulent catalyst as is provided for the suspension which produces the cover layers 6 and 7.

The thus prefabricated structural elements shown in FIG. 1 and identified by the reference numeral 10 in FIG. 2 can be assembled in a relatively simple manner into batteries such as shown in FIG. 2 after applying conductive screens 11 at the sides of the catalyst layers 8 and 9 thereof, and by additionally applying spacer screens 12 and end plates 13, for example of nickel plate, the individual structural members being pressed together by means of bolts 14 and nuts 15. The supply and discharge of reactants and of the electrolyte from the fuel cells forming the battery of FIG. 2 takes place in a conventional manner through channels that are suitably formed in the framework 1 of plastic material; these channels have been, however, omitted from the drawing in the interest of clarity.

EXAMPLE 100g of ion exchanger (Lewatit M 600, Lewatit being a registered trademark of the Badischen Anilin & Sodafabrik AG) was dried at 110°C and was comminuted in a ball mill to a powder having a grain size $< 5\mu$. The powdered ion exchanger was then mixed with 1 liter benzene (boiling point 100° to 140°C) and 12g polyisobutylene, and was treated in the ball mill until all of the polyisobutylene was dissolved and the ion exchanger exhibited a uniform distribution. Then the mixture was in turn mixed with 0.6 cm$^3$ methyl ethyl ketone peroxide, 0.6 cm$^3$ of a 1% solution of an accelerator containing cobalt and 10% by volume of xylene with respect to the benzene. Thereafter, 75 ml of the suspension was applied in the aforedescribed manner to the metal screens 2 and 5 in three layers.

For the anodic catalyst layer of the invention, 100g of dried Raney-nickel (0.33g/cm$^2$) was suspended in 150 cm$^3$ benzine (boiling point 50° to 75°C) and was mixed with 100g of a 2% by weight of polyisobutylene solution in the same benzene. The suspension thus produced was then placed in a spray gun having a stirring attachment, and was sprayed on to the cover layer 6 in three layers as it was being continually stirred. In a similar manner, a suspension was sprayed on to the cover 7, this suspension being similar to the last mentioned except for the fact that the Raney-nickel was replaced by Raney-silver.

I claim:

1. Method of producing a compact, storable structure member, formed of catalyst-layer electrodes, cover layers and framework for fuel elements which comprises welding a first metal screen member to one side of a framework portion of reduced thickness projecting from a framework formed of plastic material and forming a first shoulder having a greater length at the outer edge of the framework than the thickness of said first metal screen member, placing at least one screen of plastic material adjacent the first metal screen member, welding a second metal screen member to the other side of the framework portion, which forms a second shoulder located on the opposite side of said framework portion from said first shoulder thereof and having a greater length at the outer edge of the framework than the thickness of said second metal screen member, so as to sandwich the screen of plastic material between the first and the second metal screen members, spraying on the metal screen members at least one cover layer of fine-granular ion exchanger material suspended in a mixture of a solution of a binding agent and a solvent of the plastic material of the framework, thereafter applying to the ion exchanger cover layer at least one electrode-forming layer of a catalyst suspended in a solution of a binding agent, and drying the layers so as to bond the catalyst layer to the ion exchange cover layer.

2. Method according to claim 1 wherein the binding agent for the suspended ion exchanger material is the same as that for the catalyst.

3. Method according to claim 1, wherein at least one of the binding agents is polyisobutylene.

4. Method according to claim 3, which includes cross-linking the polyisobutylene after the spraying thereof.

5. Method according to claim 1, which includes dissolving the binding agent in a solvent mixture consisting of at least two components, the plastic material of the framework being softenable in at least one of the components and being insoluble in at least another of the components.

6. Method according to claim 5, wherein the plastic material of the framework is soluble in the one component.

7. Method according to claim 5, wherein the one component capable of softening the plastic material of the framework is of such quantity as to soften only the surface of the plastic material of the framework during the spraying step.

8. Method according to claim 6, wherein the one component capable of dissolving the plastic material of the framework is of such quantity as to dissolve only the surface of the plastic material of the framework during the spraying step.

9. A compact, storable structure member, formed of catalyst-layer electrodes, cover layers and a framework for fuel elements, comprising a framework of plastic material formed with a pair of shoulders and having a portion of reduced thickness projecting from the framework between said shoulders, respective metal screen members having a thickness smaller than the length of said shoulders at the outer edge of the framework and secured by welding to opposite sides of said reduced thickness portion of said framework, at least one screen of plastic material sandwiched between said metal screen members, and a cover layer of ion exchange particles and an electrode-forming catalyst layer of catalyst particles successively superimposed on each of said metal screen members and firmly bonded thereto by a binding agent, said shoulders extending beyond said layers.

* * * * *